United States Patent Office 3,051,688
Patented Aug. 28, 1962

3,051,688
NEW POLYMERIZATION PRODUCTS AND PROCESS FOR THEIR MANUFACTURE
Alberto Deflorin, Basel, and Arthur Maeder, Therwil, Switzerland, assignors to Ciba Limited, Basel, Switzerland
No Drawing. Filed Jan. 21, 1959, Ser. No. 788,035
Claims priority, application Switzerland Dec. 23, 1955
18 Claims. (Cl. 260—86.1)

This is a continuation-in-part of our application Serial No. 627,109, filed December 10, 1956, and now abandoned.

The present invention provides new polymers of N-mono-($\beta$-trichloro-$\alpha$-hydroxyethyl)-amides of $\alpha$:$b$-monoethylenically unsaturated mono- or dicarboxylic acids containing 3 to 4 carbon atoms.

The polymers are linear addition polymers of which at least 5, and preferably at least 10 percent by weight consist of at least one unit having the structure (1) 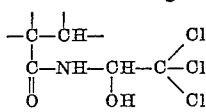

More specifically the polymers are those of which at least 5, and preferably at least 10 percent by weight consist of at least one unit of the group consisting of those having the structure of Formulae I and II (I) 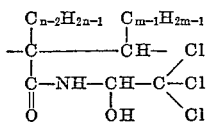

(II) 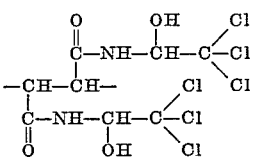

wherein $n$ and $m$ each is an integer from 1 to 2. Preferably of $n$ and $m$ is 1.

The invention provides further a composition comprising a linear addition polymer containing polymerized units selected from the group consisting of those having the Formula A (A) 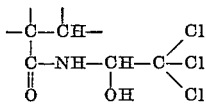

and of those obtained from a different ethylenically unsaturated monomer containing a —CH=C< group, said polymer containing from 5 to 100, preferably from 10 to 40 percent by weight of units of the Formula A and from 95 to 0, preferably from 60 to 90 percent by weight of units obtained from said different monomer containing a —CH=C< group.

Preferably and more specifically the composition contains units of the following Formulae B and C (B) 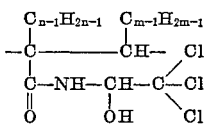

(C) 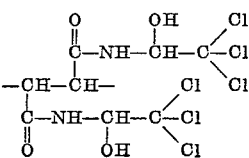

wherein $n$ and $m$ each is an integer from 1 to 2, preferably 1, and advantageously and more specifically the composition contains as units from a different monomer containing a —CH=CH< group such units from a monomer as contains a

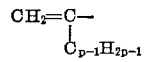

group, wherein $p$ is an integer from 1 to 2. In linear additive polymerized condition these two groups are units of the Formulae ($\alpha$) and ($\beta$)

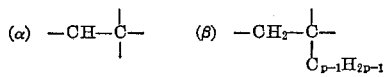

In the above mentioned Formulae I, II, B and C the two free valences represent linking valences at which as a rule a different unit is connected to build up the linear additive polymer. For example, the polymer may theoretically consist of the structure

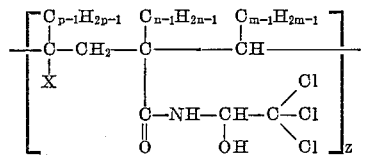

wherein $n$, $m$ and $p$ each is an integer from 1 to 2, Z is an integer from 50–1000 preferably from 100–500 and X is the radical of a different monomer.

The linear addition polymers are obtained by polymerization of N-mono-($\beta$-trichloro-$\alpha$-hydroxyethyl)-amides of the Formulae $a$ or $b$ ($a$) 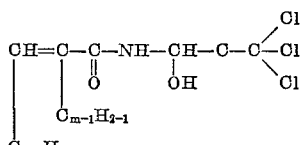

($b$) 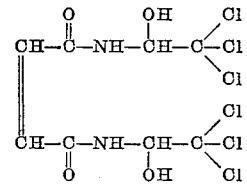

wherein $n$ and $m$ each represents an integer from 1 to 2, preferably 1.

As example of an amide corresponding to the Formula $a$ there may be mentioned the preferably used N-($\beta$-trichloro-$\alpha$-hydroxyethyl)-acrylic acid amide of the formula

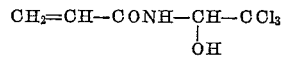

The aforesaid amides are obtained by reacting chloral (trichloroacetaldehyde) with an amide of an $\alpha$:$\beta$-monoethylenically unsaturated mono or dicarboxylic acid, which contains at least one hydrogen atom bound to the amide nitrogen atom.

As starting materials for use in the process for making the aforesaid monomer condensation products of chloral there may be used amides of crotonic acid, maleic acid, fumaric acid, and especially methacrylic acid or acrylic acid, and also amides monoalkylated at the amide nitrogen atom, for example, acrylic acid methylamide or methacrylic acid ethyl amide.

The reaction between the amide and chloral is advantageously carried out with the use of equimolecular proportions of these reactants and in the presence of an inert solvent such as an aliphatic or aromatic hydrocarbon or a halogen derivative thereof. There may be mentioned benzene, toluene, hexane, chlorobenzene, chloroform and carbon tetrachloride. Ether-like compounds can also be used as solvents, for example, dioxane or tetrahydrofurane, and there may be used saturated amides, that is to say those containing no hydrogen atom bound to the amide nitrogen atom, such as dimethyl-formamide. The reaction is advantageously carried out by heating the reactants at a moderately raised temperature, for example, 30–100° C., and it is of advantage to add a basic catalyst, especially a tertiary base, such as triethylamine, pyridine or dimethylaniline.

The so-obtained condensation products can be regarded as N-mono-($\beta$-trichloro-$\alpha$-hydroxyethyl)-derivatives of the amides used in the condensation, and they are usually colorless substances that crystallize well. According to the present invention polymerization products, including homopolymers and copolymers, are manufactured from the N-mono-($\beta$-trichloro-$\alpha$-hydroxyethyl)-amides of $\alpha$:$\beta$-unsaturated acids of the kind defined. These amides are especially suitable for the latter purpose, because the resulting polymerization products undergo cross-linking when heated or reacted with suitable compounds and can be rendered insoluble in this manner. As compared with the ordinary methylol-amides of $\alpha$:$\beta$-ethylenically unsaturated carboxylic acids, the condensation products of chloral have the surprising and unexpected advantage that usually cross-linking does not occur during polymerization, so that the two reactions can be carried out separately from one another, which is generally not possible with the usual methylol-amides. In the case of the present invention the cross-linking can be brought about, for example, on a substratum.

As has been stated above, the condensation products of chloral may be polymerized jointly with other unsaturated polymerizable compounds containing the atomic grouping —CH=C<, CH$_2$=C< or preferably $$CH_2=C-\underset{C_{n-1}H_{2n-1}}{|}$$

wherein $n$ is an integer from 1 to 2, advantageously 1.

As compounds containing these atomic groupings there are used copolymerizable mono-ethylenically unsaturated compounds, such as (a) unsaturated acids containing 3 to 4 carbon atoms, e.g. acrylic acid, $\alpha$-chloracrylic acid, methacrylic acid, and crotonic acid, (b) unsaturated cyclic anhydrides containing 4 carbon atoms, e.g. maleic acid anhydride and fumaric acid anhydride; (c) derivatives of the acrylic acid series which contain non-basic nitrogen atoms and are free from halogen atoms e.g., acrylonitrile or acrylamide and derivatives of acrylamide substituted at the amide nitrogen atom in a manner different from the amides of this invention, such as N-mono-methylacrylamide, N,N-diphenylacrylamide, N-tertiary butylacrylamide or N,N-di (2-cyanoethyl) acrylamide; (d) vinyl esters from organic acids containing 1 to 6 carbon atoms e.g., vinyl formate, vinyl acetate, vinyl butyrate and vinyl benzoate; (e) vinyl alkyl ketones e.g. vinyl methyl ketone; (f) vinyl halides containing 1 to 2 halogen atoms e.g., vinyl chloride and vinylidene chloride; (g) vinyl ethers, e.g. methyl vinyl ether or vinyl isobutyl ether; (h) vinyl aryl compounds, e.g. styrene and substituted styrenes and preferably (i) mono esters of the acrylic acid series with saturated aliphatic mono- or di-alcohols containing 1 to 12 carbon atoms, e.g. methyl acrylate, ethyl methacrylate, n-butyl acrylate, isobutyl acrylate, n-butoxyethyl acrylate, 2-ethoxy-ethanol-acrylate, decylacrylate and dodecylacrylate. Binary, tertiary or more complex copolymers can be built up in this manner.

The condensation products of chloral can be polymerized in bulk, in solution or in emulsion with the use of the customary polymerization techniques. Thus, a polymerization catalyst is advantageously used. Compounds customarily used for catalysing polymerizations, such as organic or inorganic peroxides or per-salts, for example, peracetic acid, acetyl peroxide, benzoylperoxide, benzoyl acetyl peroxide, lauryl peroxide, cumene hydroperoxide, tertiary butyl hydroperoxide, para-methane hydroperoxide, hydrogen peroxide, percarbonates, persulfates or perborates, may be used. The amount of catalyst added depends on the way in which it is desired to influence the reaction or on the properties desired in the polymerization product. If desired, a plurality of catalyzing agents may be used to bring about the polymerization. The action of the polymerization catalyst may be enhanced by the application of heat and/or actinic rays. It is possible in some cases to bring about the polymerization by the action of heat and/or actinic rays, without the addition of a catalyzing compound. In order to modify the speed of the polymerization or the molecular weight of the polymerization product obtained so-called regulators, for example, mercaptans, terpenes etc., may be used.

It is also of advantage to carry out the polymerization in the absence of air or oxygen and in the presence of an inert gas, such as nitrogen or carbon dioxide. Furthermore, in addition to the aforesaid catalysts and regulators so-called activators may be used. Such activators are, for example, inorganic oxidizable oxygen-containing sulfur compounds, such as sulfur dioxide, sodium bisulfite, sodium sulfite, ammonium bisulfite, sodium hydrosulfite and sodium sulfate. When an activator is used together with an oxygen-yielding polymerization catalyst a so-called Redox system is formed, which influences the polymerization process. As activators there may also be used water-soluble aliphatic, tertiary amines, such as triethanolamine or diethyl-ethanolamine. The action of the polymerization catalyst can also be accelerated by the addition of a heavy metal compound which is capable of existing in more than one state of valency and is present in the reduced state, or by the addition of a complex cyanide of iron, cobalt, molybdenum, mercury, zinc, copper or sulfur or a mixture of two or more such complexes. When the polymerization is carried out in emulsion, the monomeric compounds are advantageously emulsified with the aid of emulsifying agents. As emulsifying agents there may be used those of anion-active, cation-active or non-ionic character. Among the anion-active emulsifying agents there may be mentioned, for example, sulfuric acid esters of fatty alcohols, sulfonated castor oil, higher alkyl sulfonates, higher oxyalkyl sulfonates, especially sodium $\alpha$-hydroxy-octadecane sulfonate, and advantageously those which are free from other salts; sulfo-dicarboxylic acid esters, for example, the sodium salt of sulfosuccinic acid dioctyl ester and higher alkyl-aryl sulfonates. Among the cation-active emulsifying agents there may be mentioned, for example, compounds of higher fatty amines with acetic acid, hydrochloric acid or sulfuric acid, such as octadecylamine acetate, (dodecyl)-diethyl-cyclohexylamine sulfate, and also salts of diethyl amino-ethyl esters of higher fatty acids or salts of the type of oleylamidoethyl-diethylamine acetate, $$C_{17}H_{33}CONHC_2H_4NH(C_2H_5)_2.OCOCH_3$$

There are also suitable quaternary ammonium compounds such as cetyl-dimethyl-benzylammonium chloride, cetyl-trimethylammonium bromide, para-(trimethylammonium)-benzoic acid cetyl ester methosulfate, cetyl-pyridinium methosulfate, octadecyl-trimethyl-ammonium bromide and the quaternary compound of diethyl sulfate with triethanolamine tristearate.

Among the non-ionic emulsifying agents there may be mentioned polyglycol ethers of fatty acids, fatty amines or fatty alcohols of high molecular weight, such as cetyl alcohol, oleyl alcohol or octadecyl alcohol, for example, the reaction products of 15–30 mols of ethylene oxide with 1 mole of the fatty alcohol. There may also be used emulsifying agents having a pronounced cross-linking action, such as octyl-phenol polyglycol ethers, their acid sulfuric acid esters, and also dodecyl alcohol polyglycol ethers and polyhydric alcohols partially esterified with higher fatty acids, for example, glycerine monolaurate or sorbitol monolaurate. Mixtures of such emulsifying agents may also be used, or mixtures of such emulsifying agents with protective colloids, such as alginates, tragacanth, agar-agar, polyvinyl alcohols, partially hydrolysed polyvinyl esters, proteins such as glue or gelatine, and starches or starch derivatives, for example, dextrin, and also cellulose ethers, polyethylene oxides, and also generally mixtures of such emulsifying agents with water-soluble polymers or copolymers, which contain free hydroxyl, amino, carboxyl or carboxylic acid amide groups. Alternatively, such protective colloids may be used alone.

When the polymerization is carried out in solution, there may be used a solvent in which only the monomeric compound or compounds are soluble and the polymerization product is insoluble. Alternatively a solvent may be used in which the polymerization product also is soluble.

The polymerization can be carried out at the ordinary temperature, but it is more advantageous to work at a raised temperature. Suitable temperatures are, for example, within the range of 40–120° C., and especially 50–100° C. During the polymerization considerable quantities of heat are often liberated, so that suitable cooling devices must be used in order to maintain the desired polymerization temperature. This is necessary when a large quantity is to be polymerized in one batch. In order to utilize the heat liberated and to facilitate control of the polymerization temperature, it is of advantage in emulsion polymerization, for example, to introduce into the polymerization apparatus only a small portion of the total quantity of an emulsion to be treated and to initiate the polymerization in this portion. When the temperature in this portion of the emulsion reaches a certain value, for example, 60–70° C., the remainder of the emulsion may be run in the cold state in such manner that the temperature is kept constant. Towards the end of the polymerization it is often necessary to supply external heat.

The polymerization of the monomers is preferably effected in emulsion at temperatures ranging from 40 to 100° C. or in solution at temperatures ranging from 50–120° C.

Depending on the conditions of polymerization and the starting materials used the polymerization products are obtained in the form of viscous solutions, granulates or in the form of emulsions. The products obtained by the polymerization can be used directly, that is to say without further working up. However, it is often preferable first to work them up in a suitable manner. For example, modifying substances may be added such as plasticisers, for example, dibutyl phthalate, dioctyl phthalate or a sebacic acid ester, or organic or inorganic pigments or fillers. The polymerization of the monomeric compounds may also be carried out in the presence of a substratum. Thus, for example, it may be carried out on a textile material. In this case the textile material is advantageously impregnated with a solution or emulsion of the monomeric compound or compounds, and the polymerization brought about subsequently by heating the material with the addition of a polymerization catalyst.

As stated above the polymers or copolymers can be rendered insoluble by heating them at a high temperature, for example, 120–160° C., or they may be cross-linked by reaction with suitable compounds. As cross-linking agents there come into consideration in general compounds which are capable of reacting with alcoholic hydroxyl groups and/or halogen atoms. There may be used, for example, di- or poly-isocyanates, di or poly-carboxylic acids, and functional derivatives of these two types of compounds such as esters thereof with alcohols of low molecular weight, their esters or anhydrides, and compounds containing epoxy groups such as epoxy resins. Among products which react to cause cross linking there are also included formaldehyde, compounds capable of splitting off formaldehyde and compounds which react in a manner similar to formaldehyde. Among the latter kinds of compounds there may be mentioned para-formaldehyde, hexamethylene tetramine, and also dimethylol-urea and methylol-aminotriazines, such as methylol-melamines, and ethers thereof with alcohols of low molecular weight, and methylol-compounds of acetylene-diurea or ethylene-diurea or of uron. These methylol-compounds and ethers thereof with alcohols of low molecular weight may also contain residues having hydrocarbon chains of high molecular weight and/or epoxy groups. The use of products containing fatty residues may have the additional result of imparting a hydrophobic effect. There may also be used for cross-linking reactions diamines or polyamines, such as ethylene diamine, piperazine or polyalkylene polyamines such as diethylene triamine, triethylene, tetramine, tetraethylene pentamine or polyalkylene polyamines of higher molecular weight.

The cross linking reactions may be carried out in substance or in the presence of a shaped or no-shaped carrier and in the presence or absence of a solvent. They can be accelerated by heat or the addition of a catalyst. As catalysts there may be mentioned acids, such as formic acid or acetic acid, or mineral acids, or potentially acid compounds such as ammonium chloride.

The polymers particularly the copolymers of the invention are useful for a very wide range of technical applications. Suitable products can be used as lacquer bases alone or in conjunction with other lacquer resins, especially with ethers of urea-formaldehyde or melamine-formaldehyde condensation products. Products which are soluble or easily dispersible in water can be used as emulsifying agents, sizing agents or dressing agents. Suitable products can be used as additions to rubber and similar products. Many products are suitable quite generally as finishing agents in the textile, leather and paper industries, for example, as impregnating, coating or adhesive agents, and especially as binding agents for pigments. In general finishes produced with the products of the invention stand up well to wear. Textiles finished with the polymers of the invention have outstanding fastness to washing and to dry-cleaning solvents, such as trichlorethylene.

The following examples illustrate the invention, the parts being by weight unless otherwise stated and the relationship of parts by weight to parts by volume being the same as that of the kilogram to the liter:

*Example 1*

30 parts of the N-($\beta$-trichloro-$\alpha$-hydroxyethyl)-acrylic acid amide are heated under nitrogen and while stirring in 70 parts of dioxane at 95° C., and polymerized with the addition of 0.1 part of benzoyl peroxide, and after 30 minutes a further 0.1 part of benzoyl peroxide is added. The polymerization is complete after a total period of one hour. There is obtained a practically colorless highly viscous solution of poly-N-($\beta$-trichloro-$\alpha$-hydroxyethyl)-acrylic acid amide in dioxane, and, when sprayed on to a substratum and dried, this solution produces a clear colorless very firmly adherent film. The N-($\beta$-trichloro-$\alpha$-hydroxyethyl)-acrylic acid amide can be prepared as follows:

17.75 parts of acrylic acid amide (0.25 mol) are suspended in 20 parts of absolute benzene in an apparatus provided with a reflux condenser and stirring means. There are then added at room temperature, while stirring and with the exclusion of moisture, 36.88 parts of chloral (0.25 mol) followed by 0.1 part of triethylamine.

In a short time the temperature rises rapidly due to the heat of reaction. When the temperature has reached 60° C. the whole is cooled with a small amount of water and a further 30 parts of benzene are run in. The reaction product separates out with the formation of a colorless crystalline magma. When the reaction has subsided, the whole is heated for about 2 hours longer at 40° C., and then the reaction product is filtered off with suction. The product is washed with cold water and dried to yield 53 parts (corresponding to 97 percent of the theoretical yield) of N-(β-trichloro-α-hydroxyethyl)-acrylic acid amide. By recrystallizing the product from alcohol or dioxane, there are obtained colorless crystals which melt at 158° C. with decomposition and the evolution of gas. By analysis the product corresponds to the expected constitution

$C_5H_6O_2NCl_3$.—Calculated: C, 27.49%; H, 2.76%; N, 6.41%; Cl, 48.69%. Found: C, 27.50%; H, 2.90%; N, 6.26%; Cl, 48.76%.

*Example 2*

4 parts of the N-(β-trichloro-α-hydroxyethyl)-methacrylic acid amide are polymerized by the procedure given in Example 1 in 10 parts of dioxane with the addition of 0.04 part of benzoyl peroxide for 4 hours. There is likewise obtained a highly viscous practically colorless solution, which, when sprayed on a glass plate and dried, forms a colorless completely clear and transparent film. The polymer is hard and adheres strongly to the support. The polymer can be converted into an insoluble condition by addition about 0.1 percent of hydrochloric acid (calculated on the polymer) to a solution of the polymer in dioxane or methyl ethyl ketone, evaporating the solvent or allowing it to evaporate, and heating the polymer for 10 minutes at 130° C.

The N - (β - trichloro-α-hydroxyethyl)-methacrylic acid amide can be prepared as follows: A mixture of 15.8 parts of methacrylic acid amide and 29.5 parts of chloral is heated with the addition of 0.2 part of triethylamine in 85 parts of anhydrous benzene for 24 hours at 50° C., while stirring. After cooling the mixture, the reaction product which separates in crystalline form is filtered off with suction, washed several times with cold water and dried at 50° C. There are obtained 41 parts (91% of the theoretical yield) of N-(β-trichloro-α-hydroxyethyl)-methacrylic acid amide, which, when recrystallized from benzene or a mixture of alcohol and water, forms colorless lamellae melting at 136–137° C.

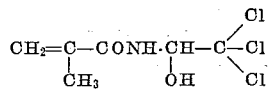

$C_6H_8O_2NCl_3$.—Calculated: C, 30.99%; H, 3.46%; N, 6.02%; Cl, 45.75%. Found: C, 30.85%; H, 3.61%; N, 6.28%; Cl, 45.63%.

*Example 3*

70 parts of isobutyl acrylate are emulsified with the addition of 0.4 part of triethanolamine, 15 parts of n-propanol, and 0.2 part of isooctanol in a solution of 2.5 parts of sodium α-hydroxyoctadecane sulfonate in 115 parts of water. To the emulsion are added 30 parts of the N-(β-trichloro-α-hydroxyethyl)-acrylic acid amide (described in Example 1) and the whole is heated at 70° C. while stirring and under nitrogen. 5 parts of an aqueous solution of 1 percent strength of potassium persulfate are then added, whereupon the polymerisation commences. After 45 minutes, a further 4 parts of the said solution of potassium persulfate are added, polymerisation is continued for 15 minutes, and then two further portions of 4 parts each of the potassium persulfate solution are added at intervals of 15 minutes. Thus, a total of 20 parts of the aqueous solution of potassium persulfate are added. When the final portion of the catalyst solution has been added, the polymerisation is continued for ½ hour at 70° C. After separating small amounts of a coagulate, there is obtained a finely divided dispersion of the copolymer, which has a content of dry resin of 34%. The yield of polymer amounts to 99.6%.

When dried on a glass plate the dispersion forms a colorless, clear and elastic, thoroughly adherent film, which has a good resistance to water. When the film is heated for 10 minutes at 130–140° C., it is very insoluble in trichlorethylene.

*Example 4*

The procedure is the same as that described in Example 3, except that there are used, instead of the N-(β-trichloro-α-hydroxyethyl)-acrylic acid amide, 30 parts of N - (β - trichloro - α - hydroxyethyl)-methacrylic acid amide. There is obtained a finely divided dispersion of the copolymer of N-(β-trichloro-α-hydroxyethyl)-methacrylic acid amide with isobutyl acrylate. When applied to a support and dried, the dispersion likewise yields a colorless, clear, non-tacky and very flexible film, which has a high resistance to water. When heated for 10–15 minutes at 140° C. the film is very insoluble in trichlorethylene.

*Example 5*

70 parts of n-butyl methacrylate and 30 parts of N-(β-trichloro-α-hydroxyethyl)-acrylic acid amide are polymerized for 4 hours at 65–80° C. with the addition of the substances mentioned in Example 3 and in the manner described in that example.

After separating 14.2 parts of coarsely dispersed copolymer, there is obtained a finely divided dispersion having a content of dry resin of 35.5%. The yield of polymer amounts to 97.3%.

This dispersion is excellently suited for producing dressings, which can be converted on textiles into the insoluble condition by the addition of a urea-formaldehyde or melamine-formaldehyde resin and heating in the presence of a catalyst capable of splitting off acid.

*Example 6*

Into a solution of 2.5 parts of sodium α-hydroxyoctadecane sulfonate, 0.4 part of triethanolamine, 0.2 part of isooctanol and 0.05 part of potassium persulfate in 100 parts of distilled water there is run in, while stirring, and introducing nitrogen, at 70° C. in the course of about 2 hours a suspension of 30 parts of N-(β-trichloro-α-hydroxyethyl)-acrylic acid amide in 70 parts of styrene and 30 parts of dimethyl-formamide. Several portions of 4 parts each of a freshly prepared aqueous solution of 1 percent strength of potassium persulfate are added at intervals of one hour and the polymerisation is carried on for a total of 4 hours at a temperature of 70–75° C.

The copolymer present in the suspension is filtered off, washed and dried. After the addition of a small amount of a compound capable of splitting off acid, the copolymer is suitable for the production of insoluble shaped masses, for example, by hot pressing.

*Example 7*

A mixture of 80 parts of acrylonitrile and 20 parts of N-(β-trichloro-α-hydroxyethyl)-acrylic acid amide is emulsified with the addition of 15 parts of tertiary butanol, 0.4 part of triethanolamine and 0.2 part of isooctanol in a solution of 2.5 parts of sodium α-hydroxyoctadecane sulfate in 130 parts of water, and polymerisation is brought about at 70° C. for 2 hours by the gradual addition of 20 parts of an aqueous solution of 1 percent strength of potassium persulfate.

The copolymer present in the suspension is filtered off, washed and dried. It is soluble in dimethylformamide and is suitable for the production of films and fibers.

*Example 8*

45 parts of vinyl acetate and 5 parts of N-(β-trichloro-α-hydroxyethyl)-crotonic acid amide are dissolved in 45 parts of alcohol, and the mixture is polymerized by heating it under reflux with the exclusion of air and with the gradual addition of a solution of 1 part of benzoyl peroxide in 5 parts of alcohol. The copolymer is precipitated with water and purified by repeated dissolution in boiling alcohol and precipitation with water.

A solution of the purified copolymer in alcohol, when applied to a glass plate and dried, leaves a tough strongly adherent colorless clear film. The N-(β-trichloro-α-hydroxyethyl)-crotonic acid amide can be prepared in the following manner: 8.5 parts of crotonic acid amide and 14.7 parts of chloral are heated in 85 parts of absolute benzene with the addition of 0.1 part of triethylamine for 8½ hours at 70° C. while stirring. After allowing the reaction mixture to stand overnight, it is evaporated to dryness in vacuo, whereby 16.5 parts (71% of the theoretical yield) of crude product are obtained in the form of a colorless crystalline mass melting at 145–146° C. When the product is recrystallized from water its melting point does not change.

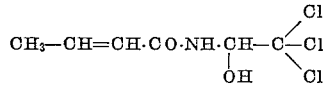

$C_6H_8O_2NCl_3$.—Calculated: C, 30.99%; H, 3.47%; N, 6.03%; Cl, 45.75%. Found: C, 30.99%; H, 3.48%; N, 6.38%; Cl, 46.34%.

Example 9

16 parts of styrene and 4 parts of N:N'-(β-trichloro-α-hydroxyethyl)-fumaric acid diamide are polymerized in 18 parts of dimethyl-formamide in the presence of 0.1 part of benzyl peroxide and 0.1 part of di-tertiary butyl peroxide for 6 hours at 110–115° C.

After cooling the mixture the copolymer is precipitated by the addition of alcohol and purified by repeated dissolution in dimethyl-formamide followed by precipitation with alcohol.

A solution of the copolymer in dimethyl-formamide, when applied to a support and dried at 80° C., forms a colorless, transparent, glossy film. The N:N'-(β-trichloro-α-hydroxyethyl)-fumaric acid diamide can be prepared as follows: A mixture of 11.4 parts of fumaric acid diamide, 29.5 parts of chloral and 0.2 part of triethylamine in 100 parts of dimethylformamide is heated for 15 hours at 50° C. The fumaric acid diamide slowly dissolves. After cooling the solution, it is filtered and the reaction product is precipitated by the addition of water. It is filtered off, washed with water and dried at 60° C. The yield amounts to 35 parts (85.5% of the theoretical yield). By recrystallizing the product from a mixture of dimethylformamide and water there are obtained colorless crystals of N:N'-(β-trichloro-α-hydroxyethyl)-fumaric acid diamide, which melts at about 283° C. with decomposition.

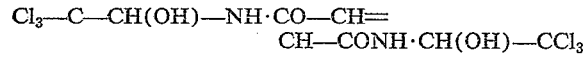

$C_8H_8O_4N_2Cl_6$.—Calculated: C, 23.50%; H, 1.97%; N, 6.85%; Cl, 52.03%. Found: C, 23.59%; H, 2.09%; N, 6.85%; Cl, 52.32%.

The following Examples 10–12 are referential examples illustrating the use of the polymers of the present invention.

Example 10

The polymer solution obtained as described in Example 1 is mixed with 0.5 percent of hydrochloric acid, and after evaporating the solvent on a glass plate a film is obtained, which can be converted into a completely insoluble form by heating it for 5 minutes at 140° C.

The polymer obtained as described in Example 1 is obtained in the form of a colorless mass by adding water to a solution of the polymer in dioxane. The polymer can be brought into solution by salt formation by means of ammonia, an alkali or an organic amine. By applying an ammoniacal aqueous solution of the polymer to a textile material, precipitating the polymer on the material by after-treating it with a dilute aqueous solution of an acid, and subsequently drying the material and heating it for a short time at 130–140° C., a permanent dressing is produced.

Example 11

30 parts of the polymer solution obtained as described in Example 1 are mixed with 1.15 parts of a solution of about 75 percent strength of a methylol-melamine butyl ether in butanol and 0.1 part of concentrated hydrochloric acid. The colorless resin mixture which remains behind after evaporating the solvent can be converted into a completely insoluble mass by heating it for 10 minutes at 130–140 ° C.

In the same manner the polymer produced as described in Example 2 can be converted with a melamine lacquer resin into an insoluble form. Accordingly, both polymer solutions are suitable for the production of thermosetting lacquers or coating preparations.

Example 12

13.3 part of the polymer solution of about 30 percent strength in dioxane obtained as described in Example 1 are mixed with 6 parts of an epoxy-resin, obtained by reacting 1 molecular proportion of 4:4'-dihydroxy-diphenyl-dimethyl methane with about 6 molecular proportions of epichlorhydrin in the presence of an aqueous alkali, and with 0.6 part of triethylene tetramine.

By applying the resulting mixture to a glass plate there is obtained, after evaporation of the dioxane, a clear colorless film, which, when heated for 15 minutes at 80–90° C., is converted into a very toughly adhering film which is insoluble in acetone.

Example 13

8 parts of N-(β-trichlor-α-hydroxyethyl)-acrylamide and 12 parts of 50% aqueous acrylic acid in 63 parts of dioxane and 10 parts of isopropanol are stirred and heated to 85° C. under nitrogen, and polymerized by the addition of 0.04 part of benzoyl peroxide in 1 part of dioxane, further additions being made 30 minutes apart, each of 0.04 part of benzoyl peroxide in 1 part of dioxane. The total quantity of benzoyl peroxide employed is 0.2 part. At the end of 6 hours polymerization is complete and there is obtained a solution of low viscosity having a resin content of 18%. The resin solution can be diluted with water. When an aqueous solution of the copolymer is allowed to dry on a glass plate, it leaves a clear, hard and brittle film.

Example 14

33.8 parts of N-(β-trichlor-α-hydroxyethyl)acrylamide, 36 parts of N-(β-trichlor-α-hydroxyethyl)-methacrylamide and 30.2 parts of maleic acid anhydride are suspended in 350 parts of benzene while being stirred under an atmosphere of nitrogen, then heated to 78° C. Polymerization is effected by the addition, in intervals of 1 hour, of 0.1 part of 2-azo-bis-isobutyronitrile in 1 part of benzene on each occasion, or a total of 1 part of the former in 1 part of the latter. After a total of 12 hours at 80° C. the reaction mixture is cooled to room temperature and the precipitate filtered off, washed with benzene, and dried at 50° C. When the white pulverulent copolymer is suspended in water and a small quantity of dilute ammonia solution is added, a clear, yellowish solution of low viscosity is obtained.

Example 15

In an atmosphere of nitrogen, 18 parts of N-(β-trichloro-β-hydroxyethyl)-acrylamide and 2 parts of decylacrylate are stirred under nitrogen at 90° C. into 75 parts of dioxane and 5 parts of water to obtain a solution. Polymerization is performed for 8 hours at 90° C. in the manner described in Example 13, a total of 0.2 part of benzoyl peroxide in 5 parts of dioxane being added. The practically colorless solution of low viscosity, when spread on a glass plate and dried, gives a colorless, clear, glossy and firmly adhering film which is insoluble in trichlorethylene.

Example 16

40 parts of vinylidene chloride, 45 parts of n-butylacrylate, 10 parts of N-(β-trichlor-α-hydroxyethyl)-acrylamide and 5 parts of acrylic acid are emulsified in a solution of 3 parts of sodium α-hydroxyoctadecane sulfonate in 110 parts of water, with the addition of 10 parts of dimethyl formamide, 0.2 part of isooctanol and 0.4 part of triethanolamine. 60 parts of this emulsion are heated to 38° C. while being stirred in an atmosphere of nitrogen. After the addition of 1 part of 2% potassium persulfate solution and 1 part of 2% bisulfite solution polymerization sets in. The remainder of the emulsion is admixed with 7 parts of the above potassium solution and introduced in portions into the polymerization vessel in the course of 30 minutes. At the same time, the remaining 8 parts of the sodium bisulfite solution are separately introduced dropwise. When the addition is complete, 2 parts of the 2% potassium persulfate solution are added and polymerization continued for 2½ hours. After separation of 5 parts of coagulated matter a finely dispersed emulsion of the copolymer is obtained. It has a resin content of 40%. When allowed to dry on a substratum, the dispersion leaves a clear, non-tacky, and moderately elastic film having a high gloss and a good fastness to water.

Example 17

58 parts of ethyl acrylate, 20 parts of vinylisobutyl ether, 20 parts of N-(β-trichlor-α-hydroxyethyl)-acrylamide and 2 parts of acrylic acid are emulsified in a solution of 3 parts of sodium α-hydroxyoctadecane sulfonate in 140 parts of water. The pH of this mixture is adjusted to 7.2 with caustic soda solution. 65 parts of the mixture are heated to 78° C. while stirring under an atmosphere of nitrogen. On addition of 2 parts of a 5% aqueous potassium persulfate solution polymerization sets in. The remainder of the emulsion is mixed with 6 parts of the above potassium persulfate solution and then added in portions to the reaction mass in the course of 45 minutes. After the addition of 2 parts of the 5% potassium persulfate solution polymerization is continued for 2½ hours. On neutralization with ammonia and filtration through felt a fine dispersion is obtained. When spread on a suitable substratum and dried the dispersion yields a very soft, non-tacky elastic film.

Example 18

20 parts of n-butylacrylate, 15 parts of 2-ethoxy-ethanol-acrylate and 15 parts of N-(β-trichlor-α-hydroxyethyl)acrylamide are polymerized in 50 parts of isopropanol and 20 parts of symmetrical dichlorethane at about 70° C. by the addition of 0.1 part of benzoyl peroxide in 2.5 parts of dichlorethane. After a polymerization period of 2 hours another 0.1 part of benzoyl peroxide in 2.5 parts of symmetrical dichlorethane are added. After a total of 7 hours of polymerization a yellowish-colored, thinly liquid solution of the polymer is obtained which when thinly spread on a glass plate and dried yields a clear, colorless, soft film.

Example 19

By following the procedure of Example 18, but replacing the 2-ethoxyethanol-acrylate by 15 parts of n-butoxyethylacrylate, there is obtained a solution of low viscosity of the polymer. When this solution is spread and dried it yields a clear, colorless, very soft film which, on textiles, can be rendered insoluble by the addition of a urea-formaldehyde resin or a melamine-formaldehyde resin and heating in the presence of a catalyst capable of splitting off acid.

The following Examples 20–22 are referential examples illustrating the use of the polymers of the present invention.

Example 20

There are mixed in an emulsifier 5 parts of a mixture consisting of 60% of pine oil, 30% oleic acid, 6.6% of potassium hydroxide and 3.4% of water, 2.1 parts of triethanolamine, 11.5 parts of a 73% solution of a mixture of methylolmelamine methyl ethers, 9.0 parts of ethylene glycol, and 24 parts of distilled water. After thorough mixing there are added slowly 140.8 parts of an emulsion obtained as described in Example 16 and having a resin content of 40%, and emulsifying is continued for 10 minutes. There is obtained a fine emulsion with a resin content of 31.3%.

49.5 parts of this mixture are mixed with 43.5 parts of a 5% sodium alginate solution, 5 parts of a mixture of methylol melamine methyl ethers, and 2 parts of a 25% ammonium chloride solution. A cotton fabric is coated with this binding agent, flock-printed, and hardened for 5 minutes at 150° C. The resulting flock-printing has good fastness properties, especially a good fastness to dry cleaning.

Example 21

The resin solution obtained as described in Example 19 is concentrated under reduced pressure and its resin content adjusted to 64.7% with isopropanol.

93 parts of this solution are mixed with 18 parts of a mixture of methylol melamine methyl ethers, and 6 parts of trichloracetic acid. A nylon fabric is coated with this mixture and, after evaporation of the solvent, hardened for 5 minutes at 150° C. There is obtained in this manner a dressing which is fast to washing at the boil and very fast to dry cleaning.

Example 22

The resin solution obtained as described in Example 15 is evaporated under reduced pressure and the colorless residue dissolved in dimethyl formamide. There is obtained in this manner a colorless, highly viscous solution having a resin content of 50%. 10 parts of this solution are mixed with 6.65 parts of a 75% butanolic solution of a butylated methylol melamine, and 7.5 parts of dimethyl formamide.

The resulting lacquer is spread on a glass plate and hardened at 130° C. for 1 hour. It yields coatings of excellent fastness to water and resistance to solvents.

What is claimed is:

1. A linear addition polymer 5 to 100 percent by weight of which consists of at least one unit selected from the group consisting of those having the structure of Formulas I and II

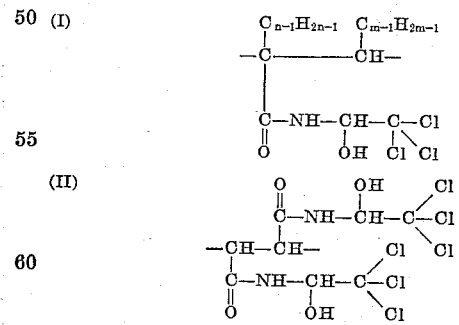

wherein n and m each is an integer from 1 to 2 and from 95 to 0 percent by weight of which polymer consists of units obtained from a different ethylenically unsaturated monomer containing one copolymerizable —CH=C< group.

2. A linear addition polymer from 5 to 100 percent by weight of which consists of at least one unit selected from the group consisting of those having the structure of Formulas I and II

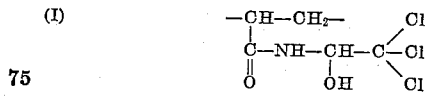

(II) 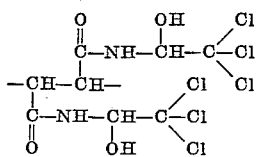

and from 95 to 0 percent by weight of which polymer consists of units obtained from a different ethylenically unsaturated monomer containing one polymerizable —CH=C< group.

3. A linear addition polymer containing polymerized units selected from the group consisting of those having the Formula A (A) 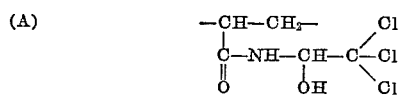

and of those obtained from a different ethylenically unsaturated monomer containing one copolymerizable —CH=C< group, said polymer containing from 5–100 percent by weight of units of the Formula A and from 95–0 percent by weight of units of said different monomer containing said —CH=C< group.

4. A linear addition polymer containing polymerized units selected from the group consisting of those having the Formula A (A) 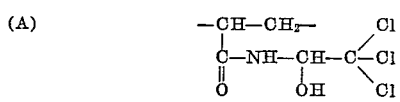

and of those obtained from a different ethylenically unsaturated monomer containing one copolymerizable —CH=C< group, said polymer containing from 10–40 percent by weight of units of the formula A and from 90–60 percent by weight of units of said different monomer containing said —CH=C< group.

5. A linear addition polymer containing polymerized units selected from the group consisting of those having the Formula A (A) 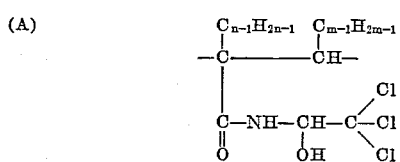

wherein $n$ and $m$ each is an integer from 1 to 2 and of those obtained from a different ethylenically unsaturated monomer containing one copolymerizable $CH_2=C<$ group, said polymer containing from 10–40 percent by weight of units of the Formula A and from 90–60 percent by weight of said different monomer containing said $CH_2=C<$ group.

6. A linear addition polymer containing polymerized units selected from the group consisting of those having the Formula A (A) 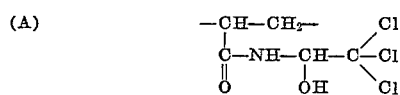

and those obtained from a different ethylenically unsaturated monomer containing one copolymerizable $CH_2=C<$ group, said polymer containing from 10–40 percent by weight of units of the Formula A and from 90–60 percent by weight of said different monomer containing sad $CH_2=C<$ group.

7. A linear addition polymer containing polymerized units selected from the group consisting of those having the Formula A (A) 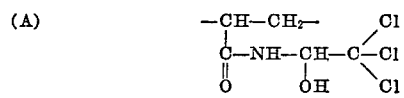

and those obtained from a different ethylenically unsaturated monomer containing one copolymerizable

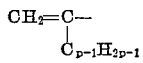

group, wherein $p$ is an integer from 1 to 2, said polymer containing from 10–40 percent by weight of units of the Formula A and from 90–60 percent by weight of said different monomer containing said

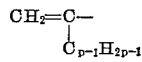

group, wherein $p$ is an integer from 1 to 2.

8. A linear addition polymer containing polymerized units selected from the group consisting of those having the Formula A (A) 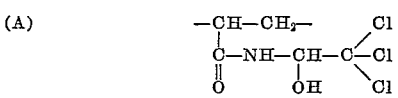

and those obtained from a copolymerizable monoester of a mono-ethylenically unsaturated acid containing 3 to 4 carbon atoms and of a saturated aliphatic alcohol containing 1 to 12 carbon atoms, said polymer containing from 10–40 percent by weight of units of the Formula A and from 90–60 percent by weight of said copolymerizable monoester.

9. A linear addition polymer containing polymerized units selected from the group consisting of those having the Formula A (A) 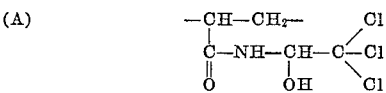

and thse obtained from a copolymerizable monoester of acrylic acid and of a saturated aliphatic alcohol containing 1 to 12 carbon atoms, said polymer containing from 10–40 percent by weight of units of the Formula A and from 90–60 percent by weight of said copolymerizable monoester.

10. A linear addition polymer containing polymerized units selected from the group consisting of those having the Formula A (A) 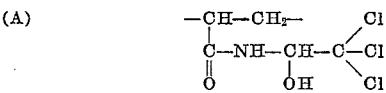

and those obtained from n-butylacrylate, said polymer containing from 10–40 percent by weight of units of the Formula A and from 90–60 percent by weight of n-butylacrylate.

11. A process for the preparation of linear additive polymers which comprises polymerizing in the presence of a polymerization catalyst and at temperatures ranging from 40 to 120° C. an N-mono-($\beta$-trichloro-$\alpha$-hydroxyethyl)-amide selected from the group consisting of compounds of the Formulae $a$ and $b$ (a) 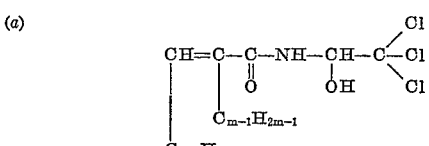

(b) 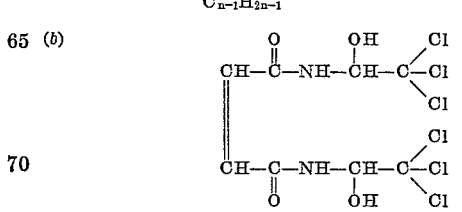

wherein $n$ and $m$ each is an integer from 1 to 2.

12. A process for the preparation of linear additive polymers which comprises polymerizing in the presence of a polymerization catalyst and at temperatures ranging from 40 to 120° C. an N-mono-(β-trichloro-α-hydroxyethyl)-amide of the Formula a (a) 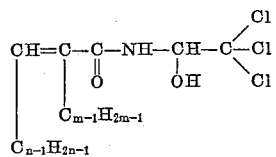

wherein n and m each is an integer from 1 to 2.

13. A process for the preparation of linear additive copolymers which comprises polymerizing in the presence of a polymerization catalyst and at temperatures ranging from 40 to 120° C. an N-mono-(β-trichloro-α-hydroxyethyl)-amide of the Formula a (a) 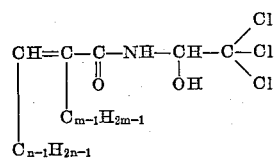

wherein n and m each is an integer from 1 to 2, with a different copolymerizable monomer containing one —CH=C< group, and wherein the amide of the Formula a is used in an amount of 10–90 percent by weight and the different monomer in an amount of 90–10 percent by weight.

14. A process for the preparation of linear additive copolymers which comprises polymerizing in the presence of a polymerization catalyst and at temperatures ranging from 40 to 120° C. an N-mono-(β-trichloro-α-hydroxyethyl)-amide of the Formula a (a) 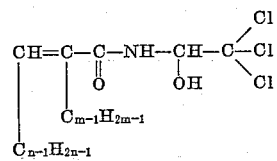

wherein n and m each is an integer from 1 to 2, with a different copolymerizable monomer containing a

—CH=C< group, and wherein the amide of the Formula a is used in an amount of 10–40 percent by weight and the different monomer in an amount of 90–60 percent by weight.

15. A process for the preparation of linear additive polymers, which comprises polymerizing in the presence of a polymerization catalyst and at temperatures ranging from 40 to 120° C. 10–40 percent by weight of N-mono-(β-trichloro-α-hydroxyethyl)-acrylamide with 60–90 percent by weight of n-butylacrylate.

16. A linear addition polymer the units of which consist of (1) from 5 to 100 percent by weight of at least one unit selected from the group consisting of those having the structure of Formulas I and II

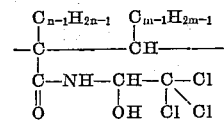 (I)

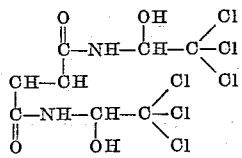 (II)

wherein each of n and m is an integer of at least 1 and at most 2, and (2) from 95 to 0 percent by weight of units obtained from at least one and at most three unsaturated monomers, each of said unsaturated monomers containing one copolymerizable —CH=C< group.

17. A linear addition polymer containing polymerized units selected from the group consisting of those having the Formula A (A) 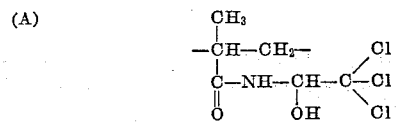

and of those obtained from a different ethylenically unsaturated monomer containing one copolymerizable —CH=C< group, said polymer containing from 5–100 percent by weight of units of the Formula A and from 95–0 percent by weight of units of said different monomer containing said —CH=C< group.

18. A linear addition polymer containing polymerized units selected from the group consisting of those having the formula A (A) 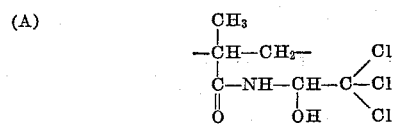

and of those obtained from a different ethylenically unsaturated monomer containing one copolymerizable —CH=C< group, said polymer containing from 10–40 percent by weight of units of the Formula A and from 90–60 percent by weight of units of said different monomer containing said —CH=C< group.

References Cited in the file of this patent

UNITED STATES PATENTS

| 2,277,480 | D'Alelio | Mar. 24, 1942 |
| 2,290,675 | D'Alelio | July 21, 1942 |
| 2,718,515 | Thomas | Sept. 20, 1955 |
| 2,760,977 | Feuer et al. | Aug. 28, 1956 |